(12) United States Patent
Bai et al.

(10) Patent No.: US 9,332,422 B2
(45) Date of Patent: May 3, 2016

(54) METHOD OF FILE TRANSMISSION BASED UPON DISTRIBUTED STORAGE IN WIRELESS COMMUNICATION SYSTEM

(75) Inventors: Yangzheng Bai, Shandong (CN); Jun Lv, Shandong (CN)

(73) Assignee: Alcatel Lucent, Boulogne-Billancourt (FR)

( * ) Notice: Subject to any disclaimer, the term of this patent is extended or adjusted under 35 U.S.C. 154(b) by 239 days.

(21) Appl. No.: 13/805,632

(22) PCT Filed: Oct. 22, 2010

(86) PCT No.: PCT/CN2010/077986
§ 371 (c)(1),
(2), (4) Date: Dec. 19, 2012

(87) PCT Pub. No.: WO2012/000258
PCT Pub. Date: Jan. 5, 2012

(65) Prior Publication Data
US 2013/0097284 A1    Apr. 18, 2013

(30) Foreign Application Priority Data

Jun. 29, 2010   (CN) .......................... 2010 1 0213925

(51) Int. Cl.
| | |
|---|---|
| G06F 15/173 | (2006.01) |
| H04W 8/24 | (2009.01) |
| H04W 4/02 | (2009.01) |
| H04L 9/32 | (2006.01) |

(Continued)

(52) U.S. Cl.
CPC ............... *H04W 8/24* (2013.01); *H04L 9/3273* (2013.01); *H04W 4/028* (2013.01); *H04W 12/06* (2013.01); *H04L 2209/80* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 6,909,893 B2 | 6/2005 | Aoki et al. | |
| 8,375,124 B1 * | 2/2013 | Schwartz | ...................... 709/224 |

(Continued)

FOREIGN PATENT DOCUMENTS

| | | |
|---|---|---|
| CN | 1823492 A | 8/2006 |
| CN | 101141172 A | 3/2008 |

(Continued)

OTHER PUBLICATIONS

International Search Report for PCT/CN2010/077986 dated Apr. 7, 2011.

*Primary Examiner* — Scott B Christensen
(74) *Attorney, Agent, or Firm* — Fay Sharpe LLP

(57) ABSTRACT

The invention proposes a method of file transmission based on distributed storage in a wireless communication network in order to meet the requirement of a user for a new service. In an embodiment of the invention, a method of file uploading includes the steps of: S11. a user equipment transmitting slice metadata information of a file to the control node to request for uploading the file to a destination; S12. the user prediction system predicating a movement of the user equipment and determining a plurality of storage wireless access nodes of the user equipment according to the movement; S13. the control node confirming the request regarding the uploading; S14. the user equipment transmitting slices of the file to the storage wireless access nodes; and S15. the storage wireless access nodes receiving and storing the slices of the file from the user equipment. With the technical solution of the invention, a file can be transmitted over a wireless communication network at a higher speed.

15 Claims, 6 Drawing Sheets

(51) Int. Cl.
*H04W 12/06* (2009.01)
*H04W 12/02* (2009.01)

(56) References Cited

U.S. PATENT DOCUMENTS

| | | | |
|---|---|---|---|
| 8,763,081 B2 | 6/2014 | Bogdanovic et al. | |
| 2001/0047400 A1* | 11/2001 | Coates et al. | 709/219 |
| 2002/0176579 A1* | 11/2002 | Deshpande et al. | 380/270 |
| 2003/0153338 A1* | 8/2003 | Herz et al. | 455/517 |
| 2003/0154238 A1* | 8/2003 | Murphy et al. | 709/201 |
| 2003/0186704 A1* | 10/2003 | Tamura et al. | 455/450 |
| 2004/0243672 A1 | 12/2004 | Markki et al. | |
| 2008/0065718 A1* | 3/2008 | Todd et al. | 709/203 |

FOREIGN PATENT DOCUMENTS

| | | |
|---|---|---|
| CN | 101227460 A | 7/2008 |
| JP | 2000-115055 A | 4/2000 |
| JP | 2001-005746 A | 1/2001 |
| JP | 2002-064848 | 2/2002 |
| JP | 2002-152112 A | 5/2002 |
| JP | 2003-322539 | 11/2003 |
| JP | 2004-171294 | 6/2004 |
| JP | 2004-304298 A | 10/2004 |
| JP | 2004349811 A | 12/2004 |
| JP | 2005-167403 A | 6/2005 |

* cited by examiner

METHOD OF FILE TRANSMISSION BASED UPON DISTRIBUTED STORAGE IN WIRELESS COMMUNICATION SYSTEM

FIELD OF THE INVENTION

The present disclosure relates to a wireless communication technology and particularly to a file transmission and distributed storage technology in a wireless communication system.

BACKGROUND OF THE INVENTION

File transmission services in an existing mobile communication system include a Multimedia Message Service (MMS) which has a limited file size of 500 kB and uses the technology of General Packet Radio Service (GPRS) for transmission at a low transmission rate (maximum 384 kbps, typically 50 kbps) and at a high expense. Although it has relatively fast message delivery time, due to its size limit and high price, this service has never entered to the pervasive mass market. And after receiver retrieves the MMS message, it is immediately deleted from MMS server, and thus can not be reused or shared.

On the trend of the web market, Google and Microsoft have already offered non-deleting search-enabled GB-size email service and file sharing service. However these web-based solutions also have shortcomings of being not aware of the sender and receiver's location information, sender and receiver's web-surfing habit, and being not able to provide better QoS and ubiquitous wireless access. An end user still has to be always online and with a fixed IP, otherwise the TCP connection will break due to a handover across cells and other reasons while a large file is being transmitted with a limited bandwidth. Then the amount of consumed power of the wireless user equipment being online all the time may be dramatically increased. A request to resume the transmission connection directly is currently absent in the HTTP and FTP protocols, and in order to resume a broken transfer, the size of the file transmitted between the client and the server has to be known and a download offset has to be altered correspondingly, which may not be supported by all the servers. An upper firewall within a network path also tends to block the new request to resume the broken transfer because the user equipment may possibly have altered its source IP address. A file-level check is absent in the HTTP and FTP protocols, and an error may occur easily, which case will be worse for a single file being too large. The entire file will also become useless even if a byte in the file is corrupted and has to be downloaded again from the very beginning. Thus it's very difficult to transmit and resume an original file accurately from a remote site via the HTTP and the FTP in a wireless context. Moreover in the Internet-based solutions, an operator becomes a conduit over which data is transmitted but can not control the direct billing information of a subscriber and thus can not easily charge the sender differently.

In view of the foregoing shortcomings in the prior art, it is currently desired to offer a high-speed file transmission, storage and search service in a wireless communication network.

SUMMARY OF THE INVENTION

In order to overcome the foregoing shortcomings in the prior art and to meet a requirement of a user for a new service, the invention proposes a method of file transmission based on distributed storage in a wireless communication system.

In an embodiment of the invention, there is provided a method of file uploading in a wireless communication network including wireless access nodes, a control node and a user prediction system. The method comprises the steps of: S11. a user equipment transmitting slice metadata information of a file to the control node to request for uploading the file to a destination; S12. the user prediction system predicating a movement of the user equipment and determining a plurality of storage wireless access nodes of the user equipment according to the movement; S13. the control node confirming the request regarding the uploading; S14. the user equipment transmitting slices of the file to the storage wireless access nodes; and S15. the storage wireless access nodes receiving and storing the slices of the file from the user equipment and transmitting storage indication information of the slices of the file to the control node.

In another embodiment of the invention, there is provided a method of downlink file transmission in a wireless communication network including wireless access nodes, a control node and a user prediction system. The method comprises the steps of: S21. the control node determining slice metadata information of a file to be transmitted to a user equipment; S22. the user prediction system predicating a movement of the user equipment and determining a plurality of storage wireless access nodes of the user equipment according to the movement; and S23. the storage wireless access nodes receiving and storing slices of the file and transmitting storage indication information of the slices of the file to the control node.

In a further embedment of the foregoing method of downlink file transmission, the method further comprises the step of: S24. the user equipment receiving the slices of the file from the storage wireless access nodes and merging the slices of the file into the file.

In another embodiment of the invention, there is provided a method of transmitting a file from a first user equipment to a second user equipment in a wireless communication network including wireless access nodes, a control node and a user prediction system. The method comprises the steps of: S31. the first user equipment transmitting slice metadata information of the file to the control node; S32. the user prediction system predicating movements of the first user equipment and the second user equipment and determining a plurality of storage wireless access nodes of the first user equipment and the second user equipment respectively according to the movements; S33. the first user equipment encrypting the slices of the file using a key generated by an SIM card of the first user equipment and transmitting the encrypted slices to the storage wireless access nodes of the first user equipment; S34. the storage wireless access nodes of the first user equipment receiving and storing the slices of the file from the first user equipment, transmitting storage indication information of the slices of the file to the control node and transmitting the slices of the file to the storage wireless access nodes of the second user equipment; S35. the storage wireless access nodes of the second user equipment receiving and storing the slices of the file and transmitting storage indication information of the slices of the file to the control node.

Optionally in the foregoing embodiment, the control node can dynamically select a relatively idle access node or nodes according to load conditions of the respective storage wireless access nodes to perform re-encryption of the file slices required by the second user equipment for the purpose of load balancing.

In an embodiment of the invention, there is provided a method of searching for a file in a wireless communication network including wireless access nodes, a control node and a user prediction system, the method including the steps of:

S41. each of the wireless access nodes building a database of keyword indexes according to keywords in file slice contents and storing the databases on the wireless access nodes when they are idle; S42. the control node receiving a request message from a user equipment regarding a search for a specific keyword and transmitting a searching command regarding the keyword to the wireless access nodes; S43. the wireless access nodes searching the databases of keyword indexes according to the searching command and reporting search matching results of slices back to the control node; S44. the user predication system predicating a movement of the user equipment and generating parameters related to locations of the wireless access nodes according to the movement; and S45. the control node generating file matching results according to the search matching results of slices in combination with the parameters related to the relative locations of the wireless access nodes where the slices are located and generating a list of download candidates according to the file matching results.

With the technical solutions of the invention, wireless access nodes in a wireless communication network are provided with a capability of distributed storage, and the transmission process of a file between a user equipment and the wireless access nodes and the transmission process of the file between the wireless access nodes can become two relatively independent processes. An end-to-end communication link between user equipments will not be required any longer, and a parallel transmission is assisted by a plurality of groups of wireless access nodes. Furthermore, a file is divided into slices, and each of the slices can be transmitted concurrently through the wireless access nodes of different systems, thereby greatly improving a speed at which the file is transmitted.

BRIEF DESCRIPTION OF DRAWINGS

Other features, objects and advantages of the invention will become more apparent upon reviewing the following detailed description of non-limiting embodiments taken with reference to the drawings in which.

Identical or like reference numerals denote corresponding features throughout the drawings.

DETAILED DESCRIPTION OF EMBODIMENTS

Figure 1:
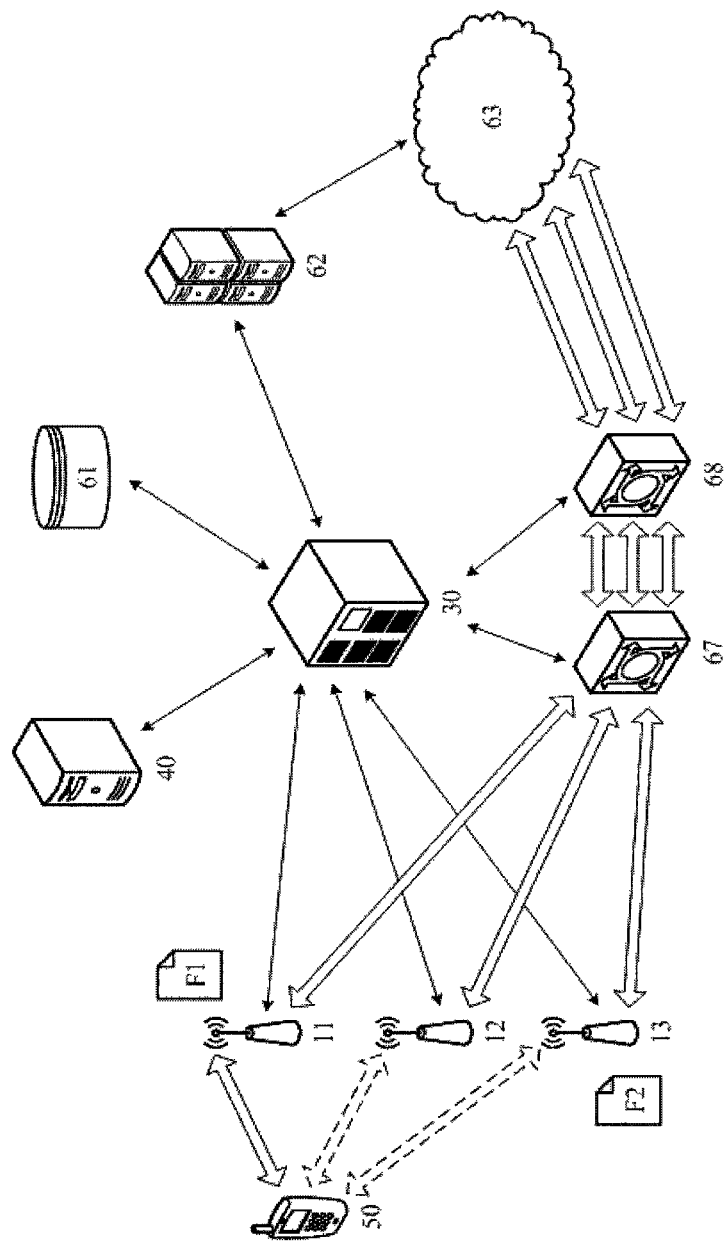
FIG. 1 illustrates a schematic diagram of system components of a wireless communication network according to an embodiment of the invention.

FIG. 1 illustrates a schematic diagram of system components of a wireless communication network according to an embodiment of the invention. As illustrated, the wireless communication network in this embodiment includes a control node 30, a user prediction system 40, wireless access nodes 11, 12 and 13, and a user equipment 50. Optionally the network further comprises a home subscriber server 61, an application server 62, an Internet network 63, and serving gateways 67 and 68.

In this embodiment, the wireless access nodes 11, 12 and 13 are, for example, but will not be limited to evolved Nodes B (eNBs), and the control node 30 is, for example, but will not be limited to a Mobility Management Entity (MME).

Figure 2:
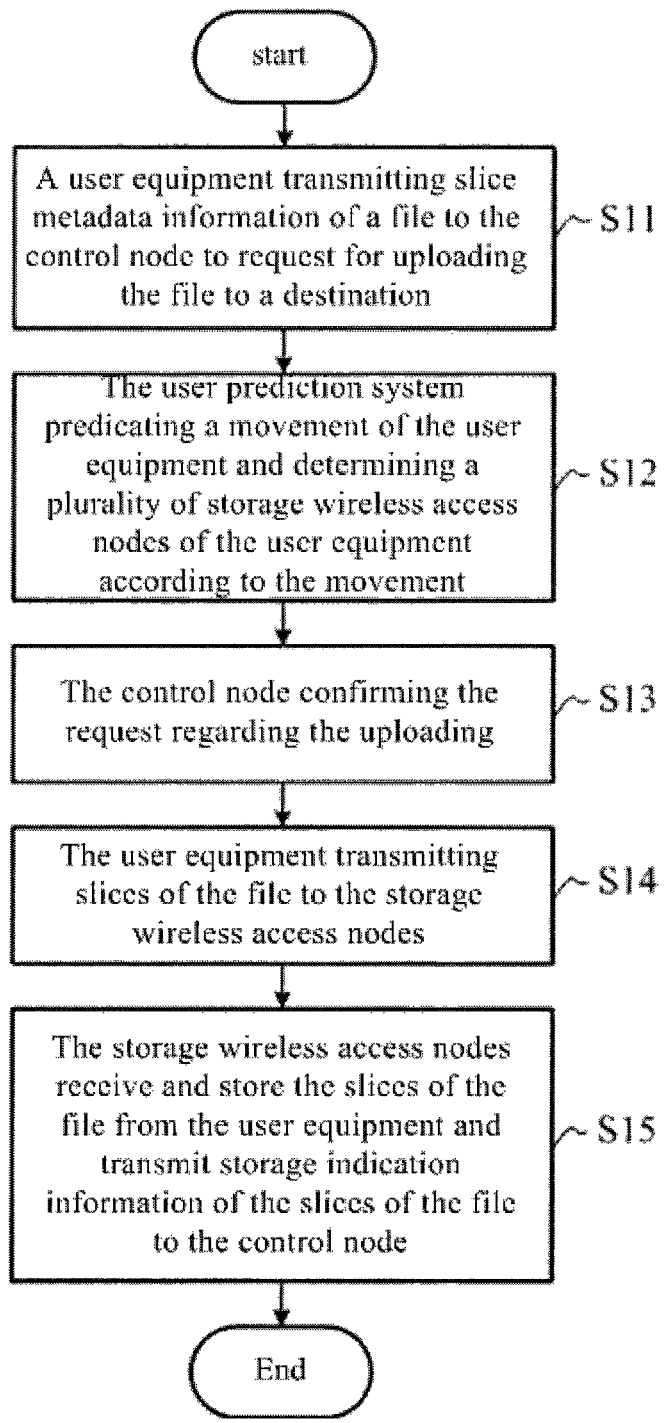
FIG. 2 illustrates a flow chart of a method of file uploading in a wireless communication network including wireless access nodes, a control node and a user prediction system according to an embodiment of the invention.

FIG. 2 illustrates a flow chart of a method of file uploading in a wireless communication network including wireless access nodes, a control node and a user prediction system according to an embodiment of the invention. As illustrated, this method comprises five steps S11, S12, S13, S14 and S15. A flow of this method will be described below with reference to FIG. 1 and FIG. 2.

In the step S11, a user equipment transmits slice metadata information of a file to the control node to request for uploading the file to a destination.

Specifically, for example, the user equipment 50 transmits slice metadata information of a file F1 to the control node 30 to request for uploading the file F1 to a destination. The slice metadata information includes, for example, but will not be limited to the size of the file, the size of a slice and the number of slices. In this embodiment, the destination to which the file F1 is uploaded is, for example, but will not be limited to a server in the Internet network.

In the step S12, the user prediction system predicates a movement of the user equipment and determines a plurality of storage wireless access nodes of the user equipment according to the movement.

Specifically, for example, the user prediction system 40 predicates a movement of the user equipment 50 and determines a plurality of storage wireless access nodes of the user equipment 50 according to the movement. For example, the user prediction system 40 predicates a movement path of the user equipment 50 and determines that the movement path traverses signal coverage areas of the wireless access nodes 11, 12 and 13 and then determines the wireless access nodes 11, 12 and 13 as storage wireless access nodes of the user equipment 50. Stated otherwise, the wireless access nodes 11, 12 and 13 are configured to store file slices uploaded from the user equipment 50.

Optionally the user prediction system 40 may predicate the movement of the user equipment 50 according to historical custom information of the user equipment 50. The historical custom information here includes a historical regular movement custom of the user equipment 50, for example, going-to-office and going-home time and routes of a working day.

Optionally the user prediction system 40 can further predict the movement of the user equipment 50 in connection with geographical information. For example, the user equipment 50 is traveling on a one-way street, and then the user prediction system 40 may predicate that the user equipment 50 will continue with going forward along this one-way street. Preferably the user prediction system 40 may further optimize a distribution of expected storage amounts of the storage wireless access nodes on the way according to a movement speed of the user equipment 50.

In the step S13, the control node confirms the request regarding the uploading.

Specifically, for example, the control node 30 confirms the request of the user equipment 50 to upload the file. If slices are encrypted, then it requests the home subscriber server of the sender according to the slice condition of the file request and a predication result of the predication system to generate an appropriate set of challenge values of the random numbers and a corresponding set of return values and to forward the set of the challenge values of the random numbers to the user equipment 50 via the wireless access node currently accessed by the user equipment 50 and while transmitting the set of the challenge values of the random numbers and the set of the return values to the respective predicated storage wireless access nodes on the way for authentication of the file slices uploaded from the user equipment.

In the step S14, the user equipment transmits slices of the file to the storage wireless access nodes.

Specifically, for example, the user equipment 50 transmits slices of the file F1 to the wireless access nodes 11, 12 and 13. Each of the wireless access nodes 11, 12 and 13 can receive the respective file slices by virtualizing several user equipments. For the user equipment 50 being a sender, each of the virtualized user equipments is a standard user equipment and thus can be compatible with existing network signaling. For the control node 30, it can also control a storage composed of each of the virtualized user equipments via the existing network standard signaling.

Optionally when the user equipment 50 may concurrently access a plurality of wireless access nodes, for example, the wireless access nodes 11 and 12, the user equipment 50 may concurrently transmit the file slices of the file F1 to the plurality of wireless access nodes.

Optionally when the user equipment 50 is handed over from the wireless access node 11 to the wireless access node 12, the file slices which have not been completely uploaded to the wireless access node 11 can be further uploaded to the wireless access node 11 via the wireless access node 12 through a temporary tunnel established between the wireless access nodes 11 and 12.

Optionally there may be only one storage wireless access node serving the user equipment 50 if the user equipment 50 does not move; and the control node 30 may further allocate an appropriate wireless access node or nodes as a temporary assisting node or nodes of the storage wireless access node of the user equipment 50 to thereby further improve the rate of uploading.

In the step S15, the storage wireless access nodes receive and store the slices of the file from the user equipment and transmit storage indication information of the slices of the file to the control node.

Specifically, for example, the wireless access nodes 11, 12 and 13 receive and store the slices of the file F1 from the user equipment 50 and transmit storage indication information of the slices of the file respectively stored by them to the control node 30. The storage indication information of the slices includes, for example, but will not be limited to indicator of the slices, an indicator of the wireless access node, etc.

Optionally after the user equipment 50 transmits all the slices of the file F1 to the storage wireless access nodes, the control node 30 may feed a practical storage distribution condition of the slices of the file F1 on the respective storage wireless access nodes back to the user predication system 40 so that the user predication system 40 revises the prediction algorithm to improve the accuracy of predication.

Optionally the control node 30 may generate an index table between files and storage indication information of slices of the files to index the file slices. A user equipment may firstly index the file in the index table while downloading the file. If the slices of the desired file have been stored in the wireless access nodes, then the download may be accelerated by downloading from the wireless access nodes. Each file has a corresponding life period for which the wireless access nodes of the file store the received slices of the file for possible downloading or sharing. A corresponding user can be alerted of whether to extend the life period of the file after the life period of the file slices expires. If the user does not keep the file, then the wireless access nodes delete all the slices of the file or dump the file slices to a dedicated server in the system. Specifically the wireless access nodes may mark the file slices to be deleted as trashed slices instead of physically really deleting the slices and delete the slice which has been kept for the longest period of time according to the time stamp order, if there is a further new space request. Thus a mobile communication network with a capability of distributed storage can be realized. The control node 30 here plays a similar role as an indexing server in the point-to-point technology, and the wireless access node here plays a similar role as a peer terminal entity in the point-to-point technology. The transmission of a file from a user equipment to a wireless access node and the transmission of the file from the wireless access node to a remote destination can become two relatively independent processes, and a communication link between the user equipment and the remote destination will not be required, thereby greatly improving a speed at which the file is uploaded.

In an embodiment of the invention, the step S14 includes: the user equipment encrypting the slices of the file using a key generated by an SIM card according to the obtained challenge value of the random number and transmitting the encrypted slices to the storage wireless access nodes.

Specifically, the user equipment 50, using a SIM card, can obtain a set of challenge values of the random numbers for authentication from the home subscriber server 61 via the control node 30 in the step S13 according to the slice condition before the file is uploaded. The step S14 further comprises: the user equipment 50 encrypting some of the slices of the file F1 using a key calculated from the SIM card and the challenge value of the random number and writing the corresponding challenge value of the random number and corresponding return values into header of the file slice to enhance the confidentiality of the file.

Optionally a different slice is encrypted using a key calculated from a different challenge value of the random number. Thus the confidentiality of the file can be further enhanced.

Optionally the step S15 further comprises: each of the wireless access nodes further verifying the file slice uploaded from the user equipment for legality as a result of comparing the challenge value of the random number and the corresponding return values obtained by itself with the challenge value of the random number and the corresponding return values of the slice.

Optionally the step S15 further comprising: if the destination is not another user equipment, the storage wireless access nodes decrypting the slices of the file from the user equipment using a key indicated by the control node and transmitting the decrypted slices to the destination.

Specifically, for example, the destination to which the file F1 is uploaded is a server in the Internet network. Then a request can be initiated to the server in the Internet network 63 via the control node 30 and the application server 62 after all the slices of the file F1 are stored in the wireless access nodes 11, 12 and 13. The control node 30 may initiate a transmission channel to be established between the wireless access nodes 11, 12 and 13 and the Internet network 63 upon confirmation from the server in the Internet network 63, and the transmission channel includes, for example, but will not be limited to the serving gateways 67 and 68. The control node 30 may instruct the wireless access nodes 11, 12 and 13 to transmit the plain slices of the file F1 to the server in the Internet network 63 in an order of file contents.

Optionally in the foregoing embodiment, the control node 30 may instruct the wireless access nodes to start the transmission of some of the plain slices without waiting for the completed uploading of all the slices, if the transmission of the slices is supported over the Internet work so as to accelerate the transmission.

The slices of the file F1 stored in the wireless access nodes 11, 12 and 13 shall be decrypted before being transmitted to the Internet network 63 since they have been encrypted using the key calculated from the challenge value of the random number of the SIM card. A decryption key is requested by the control node 30 from the home subscriber server 61 and notified to the wireless access nodes 11, 12 and 13 in such a specific process that the control node 30 obtains the challenge value of the random number of the SIM card attached to the header of each file slice from the storage indication information and reports the challenge value of the random number together with a unique identifier of the user equipment to the home subscriber server 61; the home subscriber server 61 determines a decryption key from the challenge value of the random number of the SIM card and returns the decryption key to the control node 30; and the control node 30 transmits the decryption key to the wireless access nodes 11, 12 and 13. Then the wireless access nodes 11, 12 and 13 decrypt the slices of the file F1 and transmit the decrypted slices to the Internet network 63. The file slices still stored in the wireless access nodes 11, 12 and 13 are encrypted file slices.

In an embodiment of the invention, the step S13 further includes: the control node instructing the storage wireless access nodes to reserve storage spaces.

Specifically, for example, the control node 30 confirms the request of the user equipment 30 regarding uploading the file F1, inquires the user predication system 40 to known that storage wireless access nodes of the user equipment 50 are the wireless access nodes 11, 12 and 13 and instructs the wireless access nodes 11, 12 and 13 to reserve storage spaces for storing the slices of the file F1. Thus the process of uploading the file F1 from the user equipment 50 can made more reliable and less error-prone.

In an embodiment of the invention, the user equipment transmits the slices of the file to the storage wireless access nodes in an inconsecutive manner in the step S14.

Specifically, for example, the user equipment 30 may transmit the slices 1, 5 and 7 of the file F1 to the wireless access node 11, the slices 2, 4 and 9 of the file F1 to the wireless access node 12, the slices 3, 6 and 8 of the file F1 to the wireless access node 13, etc. Thus the plurality of slices of the file F1 are transmitted in an inconsecutive manner to the plurality of storage wireless access node so that the file F1 can be more secured as a whole and the contents of a significant section of the file F1 will not be leaked due to content leakage at a specific wireless access node.

In an embodiment of the invention, the storage wireless access nodes comprise at least one group; and the storage wireless access nodes in any group store the slices of the file from the user equipment in a mutually-redundant network-sharing manner in the step S15.

Specifically, for example, the wireless access nodes 11, 12 and 13 constitute a group, and each of the wireless access nodes stores a part of the slices of the file F1 and some redundant information so that even if the file stored in a specific wireless access node is lost, the entire file F1 can be recovered from data stored in another wireless access node or nodes. Thus the reliability of file storage can be improved.

Preferably the wireless access nodes may not be physically tied to storage devices. Alternatively a network file server within the group can be virtually loaded over the network for the purpose of centralized management of storage devices (e.g., an array of RAID hard disks) at a lowered cost.

Figure 3:
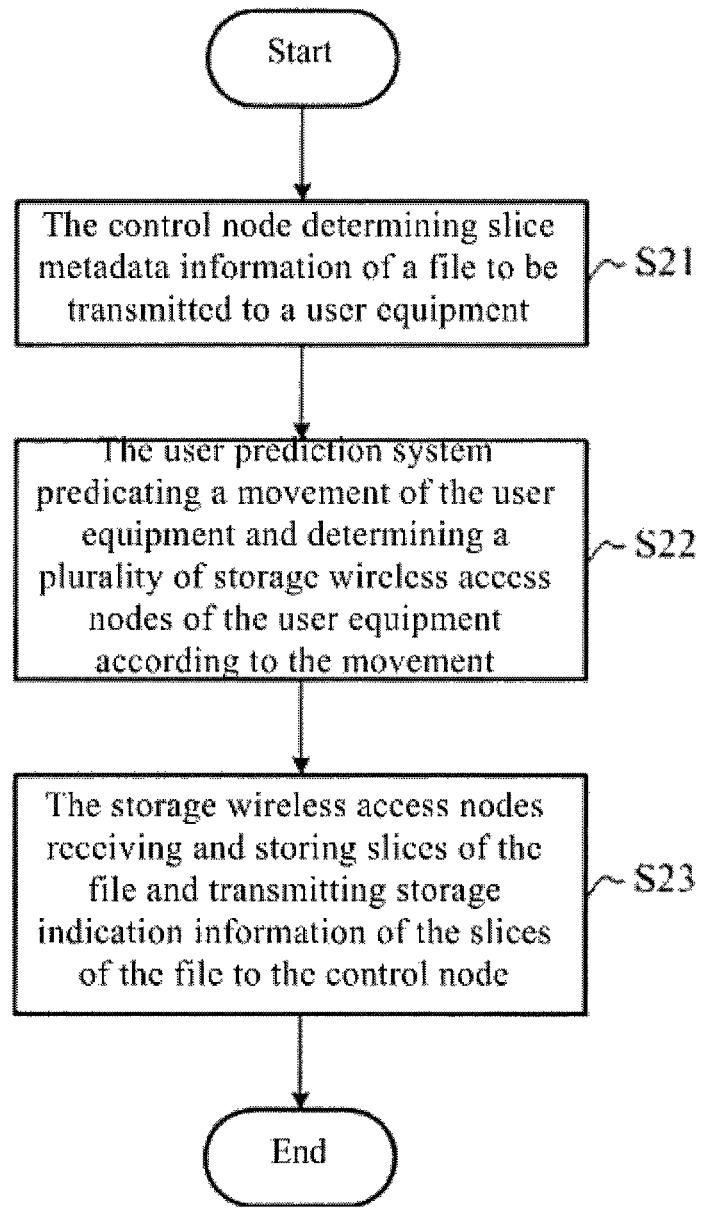
FIG. 3 illustrates a flow chart of a method of downlink file transmission in a wireless communication network including wireless access nodes, a control node and a user prediction system according to an embodiment of the invention.

FIG. 3 illustrates a flow chart of a method of downlink file transmission in a wireless communication network including wireless access nodes, a control node and a user prediction system according to an embodiment of the invention. As illustrated, this method comprises five steps S21, S22, S23, S24 and S25. A flow of this method will be described below with reference to FIG. 1 and FIG. 3.

In the step S21, the control node determines slice metadata information of a file to be transmitted to a user equipment.

Specifically, for example, the control node 30 determines slice metadata information of a file F2 to be transmitted to the user equipment 30. The slice metadata information includes, for example, but will not be limited to the size of the file, the size of a slice and the number of slices. In this embodiment, a source of the file F2 includes, for example, but will not be limited to a server in the Internet network.

In the step S22, the user prediction system predicates a movement of the user equipment and determines a plurality of storage wireless access nodes of the user equipment according to the movement.

Specifically, for example, the user prediction system 40 predicates a movement of the user equipment 50 and determines a plurality of storage wireless access nodes of the user equipment 50 according to the movement. For example, the user prediction system 40 predicates a movement path of the user equipment 50 and determines that the movement path traverses signal coverage areas of the wireless access nodes 11, 12 and 13 and then determines the wireless access nodes 11, 12 and 13 as storage wireless access nodes of the user equipment 50. Stated otherwise, the wireless access nodes 11, 12 and 13 are configured to store slices of the file F2.

Optionally the user prediction system 40 may predicate the movement of the user equipment 50 according to historical custom information of the user equipment 50. The historical custom information here includes a historical regular movement custom of the user equipment 50, for example, going-to-office and going-home time and routes of a working day.

Optionally the user prediction system 40 can further predict the movement of the user equipment 50 in connection with geographical information. For example, the user equipment 50 is traveling on a one-way street, and then the user prediction system 40 may predicate that the user equipment 50 will continue with going forward along this one-way street. Preferably the user prediction system 40 may further optimize a distribution of expected storage amounts of the storage wireless access nodes on the way according to a movement speed of the user equipment 50.

In the step S23, the storage wireless access nodes receive and store slices of the file and transmit storage indication information of the slices of the file to the control node.

Specifically, for example, the wireless access nodes 11, 12 and 13 receive and store the slices of the file F2 and transmit storage indication information of the slices of the file respectively stored by them to the control node 30. The storage indication information of the slices includes, for example, but will not be limited to indicator of the slices, an indicator of the wireless access node, etc. Each of the wireless access nodes 11, 12 and 13 can receive the respective file slices by virtualizing several user equipments. For the user equipment 50 being a receiver, each of the virtualized user equipments is a standard user equipment and thus can be compatible with existing network signaling. For the control node 30, it can also control a storage composed of each of the virtualized user equipments via the existing network standard signaling.

Optionally after the user equipment 50 completely downloads all the slices of the file F2 from the wireless access nodes, the control node 30 may feed a practical storage distribution condition of the slices of the file F2 on the respective storage wireless access nodes back to the user predication system 40 so that the user predication system 40 revises the prediction algorithm to improve the accuracy of predication.

Optionally the control node 30 may generate an index table between files and storage indication information of slices of the files to index the file slices. A user equipment may firstly index the file in the index table while downloading the file. If the slices of the desired file have been stored in the wireless access nodes, then the download may be accelerated by downloading from the wireless access nodes. Each file has a corresponding life period for which the wireless access nodes of the file store the received slices of the file for possible downloading or sharing. A corresponding user can be alerted of whether to extend the life period of the file after the life period of the file slices expires. If the user does not keep the file, then the wireless access nodes delete the file slices or dump the file slices to a dedicated server in the system. Specifically the wireless access nodes may mark the file slices to be deleted as trashed slices instead of physically really deleting the slices and delete the slice which has been kept for the longest period of time according to the time stamp order, if there is a further new space request. Thus a mobile communication network with a capability of distributed storage can be realized. The control node 30 here plays a similar role as an indexing server in the point-to-point technology, and the wireless access node here plays a similar role as a peer terminal entity in the point-to-point technology. The transmission of a file from a remote source to a wireless access node and the transmission of the file from the wireless access node to a user equipment can become two relatively independent processes, and a communication link between the user equipment and the remote source will not be required, thereby greatly improving a speed at which the file is downloaded.

In an embodiment of the invention, the method further comprises a step S24 in which the user equipment receives the slices of the file from the storage wireless access nodes and merges the slices of the file into the file.

Specifically, for example, the user equipment 50 receives the slices of the file F2 from the wireless access nodes 11, 12 and 13 and merges the slices of the file into the file F2. Optionally the wireless access nodes 11, 12 and 13 may transmit a slice of the file F2 to the user equipment upon receiving and storing the slice without waiting for the completed storage of the other slice or slices.

Optionally when the user equipment 50 may concurrently access a plurality of wireless access nodes, for example, the wireless access nodes 11 and 12, the user equipment 50 may concurrently receive the file slices of the file F2 from the plurality of wireless access nodes.

Optionally when the user equipment 50 is handed over from the wireless access node 11 to the wireless access node 12, the file slices in the wireless access node 11 which have not been completely downloaded can be further downloaded to the user equipment 50 via the wireless access node 12 through a temporary tunnel established between the wireless access nodes 11 and 12.

Optionally there may be only one storage wireless access node serving the user equipment 50 if the user equipment 50 does not move; and the control node 30 may further allocate an appropriate wireless access node or nodes as a temporary assisting node or nodes of the storage wireless access node of the user equipment 50 to thereby further improve the rate of uploading.

In an embodiment of the invention, the step 23 comprises: the storage wireless access nodes encrypting and storing the slices of the file using a key indicated by the control node, which can be generated by an SIM card of the user equipment; and the step S24 includes: the user equipment decrypting the slices of the file using the key generated by the SIM card of the user equipment.

Specifically, for example, the user equipment 50, using a SIM card, can obtain authentication from the home subscriber server 61 via the control node 30 before the slices of the file F2 are stored to the wireless access nodes. Before the step S23, the control node 30 inquires the home subscriber server 61 according to the slice condition to obtain challenge values of the random numbers and a corresponding set of keys and sets of return values, which can be generated by the SIM card of the user equipment 50, and notifies the wireless access nodes 11, 12 and 13 of these challenge values of the random numbers, keys and return values. The step 23 comprises: the wireless access nodes 11, 12 and 13 encrypting and storing the slices of the file F2 using the keys indicated by the control node and writing the corresponding challenge values of the random numbers and return values into headers of the file slices. In the step S24, upon reception of the encrypted slices of the file F2 from the wireless access nodes 11, 12 and 13, the user equipment 30 firstly determines whether the return values generated for the challenge values of the random numbers according to the SIM card are the same as the return values stored in the headers of the file slices, and if they are the same, then the user equipment decrypts these slices using the keys generated by the SIM card of the user equipment for the challenge values of the random numbers.

In an embodiment of the invention, after the step S22, the method further comprises: the control node instructing the storage wireless access nodes to reserve storage spaces.

Specifically, for example, the control node 30 inquires the user predication system 40 to known that storage wireless access nodes of the user equipment 50 are the wireless access nodes 11, 12 and 13 and instructs the wireless access nodes 11, 12 and 13 to reserve storage spaces for storing the slices of the file F2. Thus the process of downloading the file F2 to the user equipment 50 can made more reliable and less error-prone.

In an embodiment of the invention, the storage wireless access nodes receive and store the slices of the file in an inconsecutive manner in the step S23.

Specifically, for example, the user equipment 30 may instruct the wireless access node 11 to receive and store the slices 1, 5 and 7 of the file F2, instruct the wireless access node 12 to receive and store the slices 2, 4 and 9 of the file F2, instruct the wireless access node 13 to receive and store the slices 3, 6 and 8 of the file F2, etc. Thus the plurality of slices of the file F2 are transmitted in an inconsecutive manner to the plurality of storage wireless access nodes so that the file F2 can be more secured as a whole and the contents of a significant section of the file F2 will not be leaked due to content leakage at a specific wireless access node.

In an embodiment of the invention, the storage wireless access nodes comprise at least one group; and the storage wireless access nodes in any group store the slices of the file in a mutually-redundant network-sharing manner in the step S23.

Specifically, for example, the wireless access nodes 11, 12 and 13 constitute a group, and each of the wireless access nodes stores a part of the slices of the file F2 and some redundant information so that even if the file stored in a specific wireless access node is lost, the entire file F2 can be recovered from data stored in another wireless access node or nodes. Thus the reliability of file storage can be improved.

Preferably the wireless access nodes may not be physically tied to storage devices. Alternatively a network file server within the group can be virtually loaded over the network for the purpose of centralized management of storage devices (e.g., an array of RAID hard disks).

Figure 4:
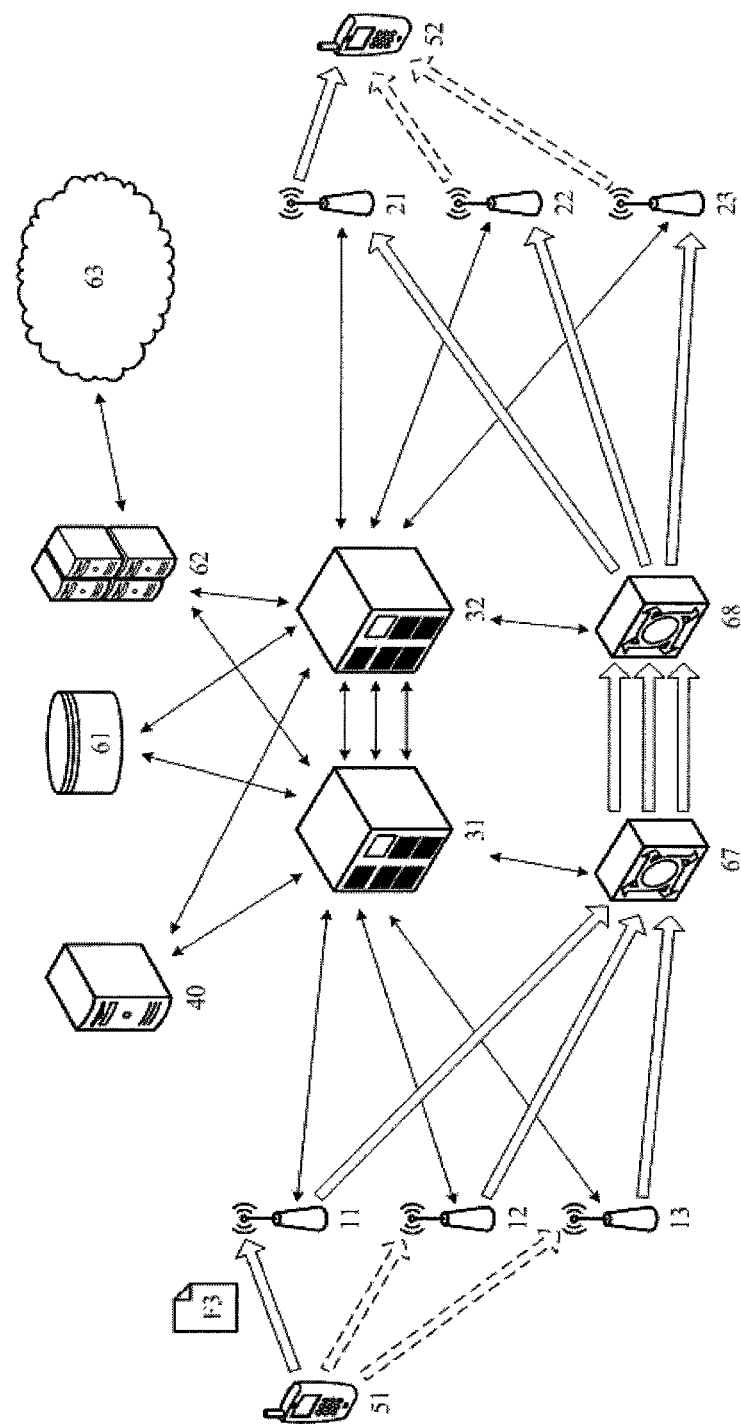
FIG. 4 illustrates a schematic diagram of system components of a wireless communication network according to a further embodiment of the invention.

FIG. 4 illustrates a schematic diagram of system components of a wireless communication network according to a further embodiment of the invention. As illustrated, the wireless communication network in this embodiment includes control nodes 31 and 32, a user prediction system 40, wireless access nodes 11, 12, 13, 21, 22 and 23, and user equipments 51 and 52. Optionally the network further comprises a home subscriber server 61, an application server 62, an Internet network 63, and serving gateways 67 and 68.

In this embodiment, the wireless access nodes 11, 12, 13, 21, 22 and 23 are, for example, but will not be limited to evolved Nodes B (eNBs), and the control nodes 31 and 32 are, for example, but will not be limited to Mobility Management Entities (MMEs).

Figure 5:
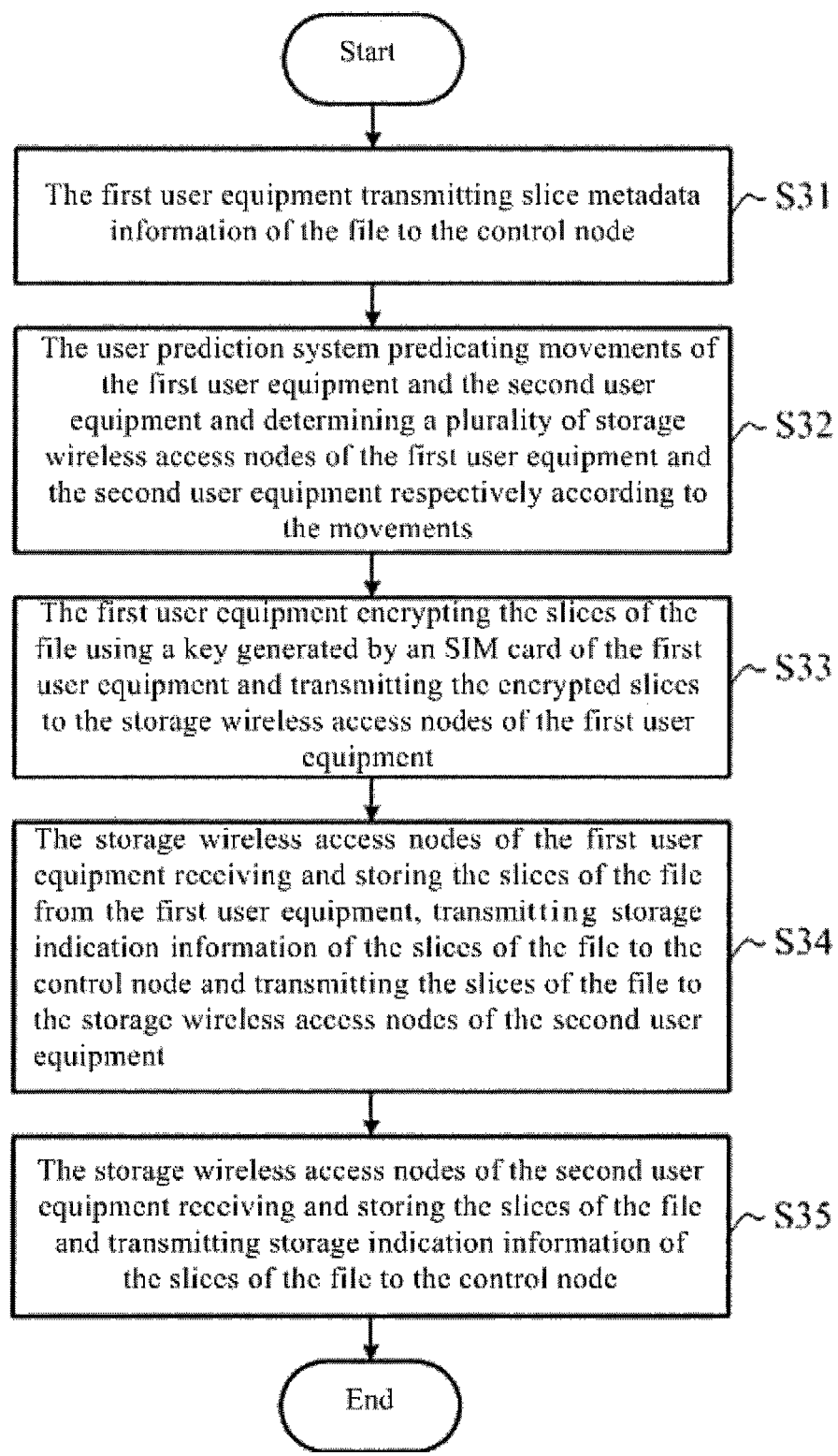
FIG. 5 illustrates a flow chart of a method of transmitting a file from a first user equipment to a second user equipment in a wireless communication network including wireless access nodes, a control node and a user prediction system according to an embodiment of the invention.

FIG. 5 illustrates a flow chart of a method of transmitting a file from a first user equipment to a second user equipment in a wireless communication network including wireless access nodes, control nodes and a user prediction system according to an embodiment of the invention. As illustrated, this method comprises five steps S31, S32, S33, S34 and S35. A flow of this method will be described below with reference to FIG. 4 and FIG. 5.

In the step S31, the first user equipment transmits slice metadata information of the file to the control node.

Specifically, for example, the user equipment 51 transmits slice metadata information of a file F3 to the control node 31 of the user equipment to request for uploading the file F3 to the user equipment 52. The slice metadata information includes, for example, but will not be limited to the size of the file, the size of a slice and the number of slices.

In the step S32, the user prediction system predicates movements of the first user equipment and the second user equipment and determines a plurality of storage wireless access nodes of the first user equipment and the second user equipment respectively according to the movements.

Specifically, for example, the user prediction system 40 predicates movements of the user equipments 51 and 52 and determines a plurality of storage wireless access nodes of the user equipments 50 and 51 according to the movements. For example, the user prediction system 40 predicates a movement path of the user equipment 51 and determines that the movement path traverses signal coverage areas of the wireless access nodes 11, 12 and 13 and then determines the wireless access nodes 11, 12 and 13 as storage wireless access nodes of the user equipment 51; and the user prediction system 40 predicates a movement path of the user equipment 52 and determines that the movement path traverses signal coverage areas of the wireless access nodes 21, 22 and 23 and then determines the wireless access nodes 21, 22 and 23 as storage wireless access nodes of the user equipment 52.

In the step S33, the first user equipment encrypts the slices of the file using a key generated by an SIM card of the first user equipment and transmits the encrypted slices to the storage wireless access nodes of the first user equipment.

Specifically, the user equipment 51, using an SIM card, may obtain authentication from the home subscriber server 61 via the control node 31 before the file is uploaded. In the step S33, the user equipment 51 encrypts the slices of the file F3 using a key calculated from the challenge value of the random number of the SIM card, writes the corresponding challenge value of the random number into a header of the file and transmits the slices to the wireless access nodes 11, 12 and 13. Thus the confidentiality of the file can be enhanced.

Optionally a different slice is encrypted using a key calculated from a different challenge value of the random number. Thus the confidentiality of the file can be further enhanced.

In the step S34, the storage wireless access nodes of the first user equipment receive and store the slices of the file from the first user equipment, transmit storage indication information of the slices of the file to the control node and transmit the slices of the file to the storage wireless access nodes of the second user equipment.

Specifically, for example, the wireless access nodes 11, 12 and 13 receive and store the slices of the file F3 from the user equipment 51, transmit storage indication information of the slices of the file respectively stored by them to the control node 31 and transmit the slices of the file F3 to the wireless access nodes 21, 22 and 23. The storage indication information of the slices includes, for example, but will not be limited to indicator of the slices, an indicator of the wireless access node, etc. Each of the wireless access nodes 11, 12, 13, 21, 22 and 23 can receive the respective file slices by virtualizing several user equipments. For the user equipments 51 and 52 being a sender and a receiver, each of the virtualized user equipments is a standard user equipment and thus can be compatible with existing network signaling. For the control nodes 31 and 32 and other existing network equipments, they can also control respective storages composed of each of the virtualized user equipments via the existing network standard signaling.

Wherein, the control nodes 31 and 32 may initiate a transmission channel to be established between the wireless access nodes 11, 12 and 13 and the wireless access nodes 21, 22 and 23, and the transmission channel includes, for example, but will not be limited to the serving gateways 67 and 68. The control node 31 may instruct the wireless access nodes 11, 12 and 13 to transmit the slices of the file F3 to the wireless access nodes 21, 22 and 23. Optionally the wireless access nodes 21, 22 and 23 store the slices of the file F3 in an order different from the order in which the wireless access nodes 11, 12 and 13 store the slices of the file F3.

Optionally the wireless access nodes 11, 12 and 13 may start the transmission of data to the wireless access nodes 21, 22 and 23 without waiting for the completed uploading of all of the slices, so as to accelerate the transmission.

In the step S35, the storage wireless access nodes of the second user equipment receive and store the slices of the file and transmit storage indication information of the slices of the file to the control node.

Specifically, for example, the wireless access nodes 21, 22 and 23 receive and store the slices of the file F3 as instructed by the control node 32 and transmit storage indication information of the stored slices to the control node 32.

The user equipment 52 receives the slices of the file F3 from the wireless access nodes 21, 22 and 23 in a similar process as that of the step S24 in the foregoing embodiment.

Optionally the control nodes 31 and 32 may generate an index table between files and storage indication information of slices of the files to index the file slices. A user equipment may firstly index the file in the index table while downloading the file. If the slices of the desired file have been stored in the wireless access nodes, then the download may be accelerated by downloading from the wireless access nodes. Each file has a corresponding life period for which the wireless access nodes of the file store the received slices of the file for possible downloading or sharing. After the life period of the file slices expires, the wireless access nodes may delete the file slices or dump the file slices to a dedicated server in the system. Thus a mobile communication network with a capability of distributed storage can be realized. The control nodes 31 and 32 here play a similar role as an indexing server in the point-to-point technology, and the wireless access node here plays a similar role as a peer terminal entity in the point-to-point technology. The transmission process of a file between a user equipment and wireless access nodes and the transmission process of the file between the wireless access nodes can become two relatively independent processes, and an end-to-end communication link between the user equipments will not be required, thereby greatly improving a speed at which the file is transmitted.

In an embodiment of the invention, the step S34 further comprises: the storage wireless access nodes of the first user equipment decrypting the slices of the file using the SIM card key of the first user equipment obtained from the control node and encrypting the slices of the file using an SIM card key of the second user equipment obtained from the control node.

Specifically, for example, the wireless access nodes 11, 12 and 13 obtain keys corresponding to challenge values of the random numbers of the SIM card of the user equipment 51 from the control node 31 and decrypt the stored slices of the file F3 using these keys into plain slices. Then the wireless access nodes 11, 12 and 13 obtain keys from the control node 32, which can be generated by an SIM card of the user equipment 52, re-encrypt the plain slices of the file F3 using these keys and write corresponding random numbers into headers of the file slices. The wireless access nodes 11, 12 and 13 transmit the re-encrypted slices of the file F3 to the wireless access nodes 21, 22 and 23.

In an embodiment of the invention, the step S35 further comprises: decrypting the slices of the file using the SIM card key of the first user equipment and encrypting the slices of the file using an SIM card key of the second user equipment, and storing the slices of the file encrypted using the SIM card key of the second user equipment.

Specifically, for example, the slices of the file F3 received by the wireless access nodes 21, 22 and 23 from the wireless access nodes 11, 12 and 13 are encrypted with the keys generated by the SIM card of the user equipment 51. The wireless access nodes 21, 22 and 23 obtain keys corresponding to the challenge values of the random numbers of the SIM card of the user equipment 51 from the control node 31 and decrypt the stored slices of the file F3 using these keys into plain slices. Then the wireless access nodes 21, 22 and 23 obtain keys from the control node 32, which can be generated by an SIM card of the user equipment 52, re-encrypt the plain slices of the file F3 using these keys and write corresponding random numbers into headers of the file slices. The wireless access nodes 21, 22 and 23 store the re-encrypted slices of the file F3.

In an embodiment of the invention, optionally in the steps S34 and S35, the control nodes can dynamically select a relatively idle access node or nodes among the wireless access nodes 11, 12, 13, 21, 22 and 23 according to load conditions of the respective storage wireless access nodes to perform re-encryption of the file slices required by the second user equipment for the purpose of load balancing.

By encrypting the file slices stored on the wireless access nodes with the random keys of the SIM cards, the file sharing object and range can be easily controlled, and the charging management can be easily performed while a strong confidentiality can be provided.

In the foregoing embodiment, the user equipment 51 is controlled by the control node 31, and the user equipment 52 is controlled by the control node 32. Those skilled in the art shall appreciate that the two user equipments can be controlled by the same control node when they are closely located. The storage wireless access nodes of the two user equipments can partially or wholly coincide. Optionally, when the storage wireless access nodes of the user equipments 51 and 52 partially or wholly coincide, these wireless access nodes store the file slices encrypted using the key generated by the SIM card of the uploader, and the downloader receives the file slices re-encrypted using the key generated by the SIM card of the downloader after the file slices of the uploader are decrypted. In order to save a space, it is not necessary for the coinciding wireless access node or nodes to store two duplicates of the file slices, which is particularly suitable for the case that the uploader performs mass transmission of a file to a group of receiving users adjacent in physical location (for example, workmates in an office), where a wireless access node keeps only a minimum number of necessary file slices.

Optionally in the wireless communication network of the foregoing embodiment, the control nodes can instruct a wireless access node with a spare storage space to share a storage task of a wireless access node with an insufficient storage space. If a wireless access node has insufficient storage space, then historical data or data with its life period approaching expiration can be dumped to a backup server to thereby optimize the storage capacity.

Optionally the wireless access nodes can report periodically the storage indication information of the stored file to the control node to facilitate updating of the index table at the control node. The contents of the storage indication information include, for example, but will not be limited to an indicator or indicators of the file or the slices, an indicator of a user, the size of a file or a slice, an abstract or abstracts of the file or the slices, etc.

In the foregoing embodiment of the invention, a USIM card is adopted in the user equipments, and the file slices are encrypted/decrypted using a key that can be obtained by the USIM. The use of the USIM card can make full use of an advantageous characteristic of bi-directional authentication. The user is authenticated by the network while the network is authenticated by the user as well to thereby enhance the security and manageability of file transmission and sharing. A signaling integrity key can also be generated using the USIM card to protect the integrity of the file slices. Specifically the hash value of the content of the file slice can be added to the header of the file slice, and the calculation is performed on the entire header of the file slice using the integrity key, and calculation results are appended at the end of the original header of the file slice for verification at the receiver.

Figure 6:
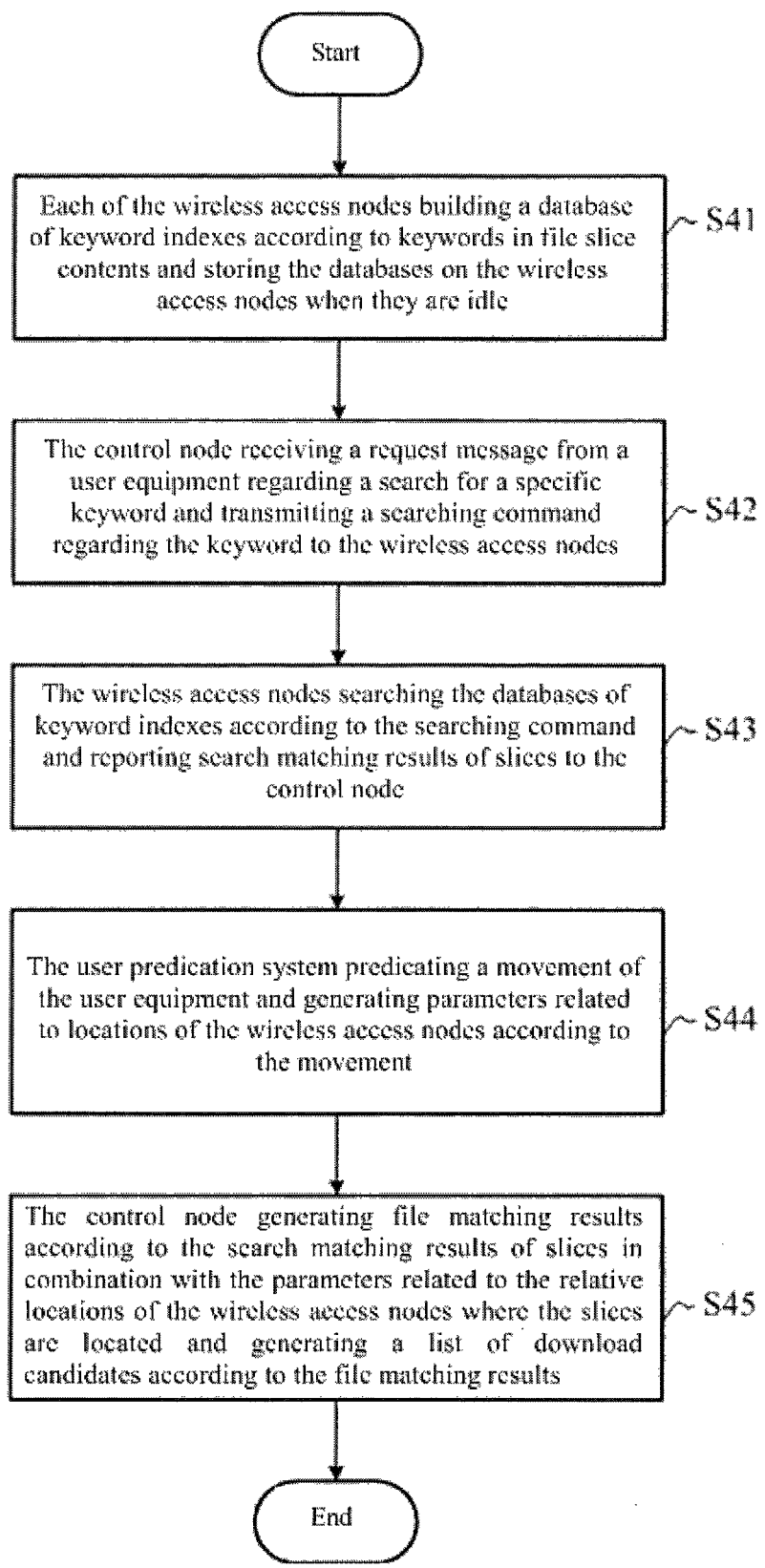
FIG. 6 illustrates a flow chart of a method of searching for a file in a wireless communication network including wireless access nodes, a control node and a user prediction system according to an embodiment of the invention.

FIG. 6 illustrates a flow chart of a method of searching for file contents in a wireless communication network including wireless access nodes, a control node and a user prediction system according to an embodiment of the invention. As illustrated, this method includes five steps S41, S42, S43, S44 and S45. A flow of this method will be described below with reference to FIG. 1 and FIG. 6.

In the step S41, each of the wireless access systems builds keyword indexes according to the contents of their stored file slices when they are idle. The wireless access node may determine whether to build an index for the content of the file slice according to information about the extension of the original file in the header of the slice. If an index can be built, then the wireless access node scans the content of the slice for keywords, and the keywords may be, for example, but will not be limited to those which appear repeatedly in the content of the slice, but will not be excludable auxiliary words, modal words, punctuations, etc. New database of indexes of the slice contents ranked according to importance of the respective keywords is created on the storage space of the wireless access node according to the location and relevancy of the keywords. This process can be performed constantly at background of the wireless access node as a process with a low priority.

In the step S42, the control node receives a request message from a user equipment regarding a search for a specific keyword and transmits a searching command regarding the file to the wireless access nodes.

Specifically, for example, the control node 30 receives a request message from the user equipment 50 regarding a search for a keyword W1 and transmits a searching command regarding the keyword Who the wireless access nodes controlled by the control node, including the wireless access nodes 11, 12 and 13.

In the step S43, the wireless access nodes search the stored databases of keyword indexes according to the searching command and report search matching results of stored slices back to the control node.

Specifically, for example, the wireless access nodes controlled by the control node 30, including the wireless access nodes 11, 12 and 13, search their respective databases of keywords, built according to the contents of the stored slices, according to the searching command and report the search matching results of the stored slices to the control node 30.

In the step S44, the user predication system predicates a movement of the user equipment and generates parameters related to locations of the wireless access nodes according to the movement.

Specifically, for example, the user predication system 40 predicates a movement of the user equipment 50 and generates parameters related to relative locations between the wireless access nodes and the user equipment 50 according to the movement. A normalized parameter can be adopted so that the parameter of the wireless access node closet to the user equipment 50 is 1. The further a wireless access node is located from the user equipment 50 the lower its corresponding parameter is.

In the step S45, the control node generates file matching results according to the search matching results of slices in combination with the parameters related to the relative locations of the wireless access nodes where the slices are located and generate a list of download candidates according to the file matching results.

Specifically, for example, the control node 30 generates file matching results according to the search matching results of slices, reported from the wireless access nodes controlled by the control node 30, in combination with the parameters related to the relative locations of the wireless access nodes where the slices are located. The control node 30 may firstly calculate relative matching results of the respective slices, possibly as the products of the search matching results of the slices and the proportions of the corresponding slices in the entire file. Then a distance relative matching result is calculated according to the relative matching results and the parameters related to the relative locations of the wireless access nodes where the slices are located, possibly as the products of these two parameters. Finally a distance matching result of the file is calculated, possibly as the simple arithmetic sum of the distance relative matching results of all the slices of the file, A corresponding normalized parameter for the matching result of the file may be further calculated so that the corresponding parameter of the file with a higher extent of matching with the keyword W1 is closer to 1 and the corresponding parameter of the file with a lower extent of matching with the keyword W1 is closer to 0. The control node 30 may generate a list of download candidates in an order of the matching extents, and each entry in the list of download candidates includes an identifier of a wireless access node and an identifier of a file slice. The control node 30 can instruct the user equipment 50 to perform downloading according to an identifier of the wireless access node and the identifier of the file slice in an entry highly ranked in the list of download candidates.

Those skilled in the art shall appreciate that the step S43 and the step S44 may not necessarily be in an exact sequential relationship.

Optionally if the file slices stored in the wireless access nodes are encrypted, then the wireless access nodes request the control node 30 to inquire the subscriber home server 40 to obtain corresponding keys of the slices in the step S41, and the wireless access nodes decrypt the slices with the keys of the slices and build databases of keyword indexes in the step S41. The wireless access node and the control system can establish a trust relationship and an encrypted control channel through a third-party authentication system. The databases of keyword indexes can also be encrypted by the wireless access nodes using random keys indicated by the control node. The control node may transmit the random keys together with the searching request to the respective corresponding wireless access nodes for decryption of the databases.

Optionally the index table on the control node may include relationships between respective users, for example, an unencrypted disclosure, the same user, a friend, a friend of a friend, a stranger, etc., to thereby further improve the efficiency of association searching.

Specifically for searching and downloading through a friend, an access privilege and the downloadable size and speed of a file can be particularly setting according to the owner user of the file, and charging can be enforced according to the amount of download access traffic so that an operator can offer an encouraging premium to the owner of the file.

Optionally the index table on the control node may include hash values of the contents of the file slices, and the same file slices stored on different wireless access nodes can be discovered during the searching to thereby improve a download speed. This method is corresponding to an operation of searching for a seed source in P2P downloading. The hash values of the contents of the file slices can also be used as check values for uploading or downloading or transmission.

Optionally a user identification code subjected to unidirectional transformation by a hash function can be written into the header of the stored file slice to authenticate the user for legality of the file slice prior to downloading. Only the user equipment is authenticated distinguishing from the SIM card encryption. Specifically, for example, an uploading user can write a user identification code transformed by a hash function into the header of the slice and upload the slice to the wireless access node. Then when the control node detects that the header of the slice stored on the wireless access node includes the user identification code, the control node requests a downloading user to input the identification code and calculates and compares a result after a transformation using the hash function. The downloading user is authorized to start downloading of the content of the file slice if a comparison result shows consistency.

Optionally the system may incorporate other Internet data information captured by the wireless access nodes, e.g., an AGPS-based Google map searching application, and dynamically store, a part of subsets of a map data file about a corresponding route, in advance on the wireless access nodes according to a searching request, a return result and a predicated user location to thereby improve a download experience of the user on the way.

The advantages brought by the technical solutions of the invention includes but not limited to:

1. An operator may perform bidirectional charging according to the size and storage period (life period) of a file and offers a better service with the help of a distributed storage of wireless access nodes and a predicated user location.

2. A rare file may be stored for a long period on the storage of wireless access nodes, and the absence of a file seed as in BT will not arise.

3. The operator may provide an index of disclosed information and obtain favorite information of a wide variety of users to thereby optimize distributed cloud storage of the information.

4. The operator may encrypt and store a private file to thereby conveniently control a range in which the file is received or shared and also to facilitate charging management and to enhance copyright protection.

5. Wireless access nodes act as peer entities in which a file is stored to assist a user equipment in downloading or uploading, and a download or upload bandwidth can be increased to the maximum extent for an asymmetric shared wireless channel.

Those skilled in the art shall appreciate that all of the foregoing embodiments are illustrative but not limiting. Different technical features appearing in different embodiments can be combined to advantage. Those skilled in the art shall appreciate and implement other variant embodiments of the disclosed embodiments upon review of the drawings, the description and the claims. In the claims, the term "comprising" will not preclude another device(s) or step(s); the indefinite article "a/an" will not preclude plural; and the terms "first", "second", etc., are intended to designate a name but not to represent any specific order. Any reference numerals in the claims shall not be construed as limiting the scope of the invention. Functions of a plurality of parts appearing in a claim can be performed by a separate module in hardware or software. Some technical features appearing in different dependent claims will not mean that these technical features can not be combined to advantage.

The invention claimed is:

1. A method of file uploading in a wireless communication network including wireless access nodes, a control node and a user prediction system, the method comprising:

the control node receiving a request from a user equipment to upload a file to a destination:

the control node receiving slice metadata information of the file from the user equipment requesting the uploading of the file to the destination,
wherein the file is divided into a plurality of slices of substantially equal size, and
wherein the slice metadata information includes the size of each slice and the number of slices;

the user prediction system predicting a movement of the user equipment and determining a plurality of storage wireless access nodes to be used by the user equipment according to the movement while uploading the file;

based on the predicted movement of the user equipment, configuring each of the plurality of storage wireless access nodes to be used by the user equipment to store one or more different slices of the file to store the entire file within the plurality of storage wireless access nodes;

the control node confirming the request to the user equipment node;

the control node receiving encryption information to be used to encrypt the plurality of slices from the user equipment;

the storage wireless access nodes predicated to be used by the user equipment receiving the slices of the file from the user equipment according to the movement;

the storage wireless access nodes storing the slices of the file from the user equipment and transmitting storage indication information of the slices of the file to the control node;

the control node initiating a request to the destination to establish channels between the plurality of storage wireless access nodes and the destination to transmit the slices to the destination, wherein the encryption information is used to decrypt the slices before transmitting the slices to the destination.

2. The method according to claim 1, wherein: the storage wireless access nodes receive slices of the file, from the user equipment, encrypted using a key generated by an SIM card.

3. The method according to claim 2, wherein the receiving and storing comprises: the storage wireless access nodes decrypting the slices of the file using a key indicated by the control node and transmitting the decrypted slices to the destination if the destination is not another user equipment.

4. The method according to claim 1, wherein the confirming further comprises: the control node instructing the storage wireless access nodes to reserve storage spaces.

5. The method according to claim 1, wherein the storage wireless access nodes receive the slices of the file in an inconsecutive manner.

6. The method according to claim 1, wherein the storage wireless access nodes comprise at least one group; and the storage wireless access nodes in any group store the slices of the file in a mutually-redundant network-sharing manner.

7. A method of downlink file transmission in a wireless communication network including wireless access nodes, a control node and a user prediction system, the method comprising:

the control node receiving a request from a user equipment to upload a file to a destination;

the control node determining slice metadata information of a file to be transmitted to a user equipment;

the user prediction system predicting a movement of the user equipment and determining a plurality of storage wireless access nodes to be used by the user equipment according to the movement while uploading the file; and based on the predicted movement of the user equipment, configuring each of the plurality of storage wireless access nodes to be used by the user equipment to store one or more different slices of the file to store the entire file within the plurality of storage wireless access nodes;

the storage wireless access nodes predicted to be used by the user equipment receiving and storing slices of the file and transmitting storage indication information of the slices of the file to the control node;

the control node initiating a request to the destination to establish channels between the plurality of storage wireless access nodes and the destination to transmit the slices to the destination, wherein the encryption information is used to decrypt the slices before transmitting the slices to the destination.

8. The method according to claim 7, further comprising: merging the slices of the file into the file.

9. The method according to claim 7, wherein:
the access nodes receiving and storing comprises: the storage wireless access nodes encrypting and storing the slices of the file using a key indicated by the control node;
wherein the slices may be decrypted using a key generated by the SIM card of the user equipment.

10. The method according to claim 7, wherein the storage wireless access nodes receive and store the slices of the file in an inconsecutive manner.

11. The method according to claim 7, wherein the storage wireless access nodes comprise at least one group; and the storage wireless access nodes in any group store the slices of the file in a mutually-redundant network-sharing manner.

12. A method of transmitting a file from a storage wireless access node used by a first user equipment to a storage wireless access node used by a second user equipment in a wireless communication network including storage wireless access nodes, a control node and a user prediction system, the method comprising:
the control node receiving a request from a first user equipment to upload a file;
receiving slice metadata information of the file by the control node;
wherein the file is divided into a plurality of slices of substantially equal size, and
wherein the slice metadata information includes the size of each slice and the number of slices;
predicting, via the user prediction system, movements of the first user equipment and the second user equipment and determining a plurality of storage wireless access nodes to be used by the first user equipment and the second user equipment respectively according to the movements while uploading the file;
based on the predicted movement of the first user equipment, configuring each of the plurality of storage wireless access nodes to be used by the user equipment to store one or more different slices of the file to store the entire file within the plurality of storage wireless access nodes;
receiving at the storage wireless access nodes used by the first user equipment slices of the file, encrypted using a key generated by an SIM card of the first user equipment;
the storage wireless access nodes predicted to be used by the first user equipment receiving and storing the slices of the file from the first user equipment, transmitting storage indication information of the slices of the file to the control node and transmitting the slices of the file to the storage wireless access nodes used by the second user equipment;
the storage wireless access nodes predicted to be used by the second user equipment receiving and storing the slices of the file and transmitting storage indication information of the slices of the file to the control node.

13. The method according to claim 12, wherein the access nodes used by the first user equipment receiving and storing further comprises: the storage wireless access nodes used by the first user equipment decrypting the slices of the file using the SIM card key of the first user equipment obtained from the control node and encrypting the slices of the file using an SIM card key of the second user equipment obtained from the control node.

14. The method according to claim 12, wherein the access nodes used by the second user equipment receiving and storing further comprises: decrypting the slices of the file using the SIM card key of the first user equipment and encrypting the slices of the file using a SIM card key of the second user equipment, and storing the slices of the file encrypted using the SIM card key of the second user equipment.

15. A method of searching for a file in a wireless communication network including wireless access nodes, a control node and a user prediction system, the method comprising:
the control node receiving a request from a user equipment to upload a file to a destination;
wherein the file is divided into a plurality of slices of substantially equal size, and
wherein the slice metadata information includes the size of each slice and the number of slices;
each of the wireless access nodes building a database of keyword indexes according to keywords in the file slice contents and storing the databases on the wireless access nodes when they are idle;
the control node receiving a request message from the user equipment regarding a search for a specific keyword and transmitting a searching command regarding the keyword to the wireless access nodes;
the wireless access nodes searching the databases of keyword indexes according to the searching command and reporting search matching results of slices back to the control node;
the user predication system predicating a movement of the user equipment and generating parameters related to locations of the wireless access nodes according to the movement while uploading the file slices; and
the control node generating file matching results according to the search matching results of the slices in combination with the parameters related to the relative locations of the wireless access nodes where the slices are located and generating a list of download candidates according to the file matching results,
the control node initiating a request to the destination to establish channels between the plurality of storage wireless access nodes and the destination to transmit the slices to the destination,
wherein the encryption information is used to decrypt the slices before transmitting the slices to the destination.

* * * * *